United States Patent
Heitzenrater et al.

(10) Patent No.: US 10,337,562 B2
(45) Date of Patent: Jul. 2, 2019

(54) CLUTCH FOR A TRANSMISSION

(71) Applicant: GM Global Technology Operations LLC, Detroit, MI (US)

(72) Inventors: Scott W. Heitzenrater, Orion, MI (US); Russell D. Maki, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 15/186,083

(22) Filed: Jun. 17, 2016

(65) Prior Publication Data

US 2017/0363154 A1  Dec. 21, 2017

(51) Int. Cl.
| | |
|---|---|
| F16D 11/00 | (2006.01) |
| F16D 13/52 | (2006.01) |
| F16D 13/64 | (2006.01) |
| F16D 13/68 | (2006.01) |
| F16D 13/69 | (2006.01) |
| F16D 21/00 | (2006.01) |

(52) U.S. Cl.
CPC .............. *F16D 11/00* (2013.01); *F16D 13/52* (2013.01); *F16D 13/646* (2013.01); *F16D 13/683* (2013.01); *F16D 13/69* (2013.01); *F16D 21/00* (2013.01)

(58) Field of Classification Search
None
See application file for complete search history.

(56) References Cited

U.S. PATENT DOCUMENTS

| | | | |
|---|---|---|---|
| 2,855,802 A | 10/1958 | Gorsky | |
| 2,995,956 A | 8/1961 | Moore | |
| 3,584,720 A * | 6/1971 | Bark | F16D 13/52 188/72.3 |
| 3,735,474 A * | 5/1973 | Bark | F16D 13/52 192/107 R |
| 4,252,226 A | 2/1981 | Staub | |
| 4,291,790 A | 9/1981 | Staub | |
| 4,396,101 A * | 8/1983 | Black | F16D 13/52 192/70.2 |
| 4,398,436 A | 8/1983 | Fisher | |

(Continued)

FOREIGN PATENT DOCUMENTS

| | | |
|---|---|---|
| DE | 3139658 A1 | 4/1983 |
| DE | 3423210 A1 | 4/1985 |

(Continued)

*Primary Examiner* — Jacob S. Scott

(57) ABSTRACT

A torque transmitting device for an automotive transmission includes a clutch housing with a plurality of internal splines, a clutch hub with a plurality of external splines extending radially outwardly from the clutch hub, a plurality of friction plates with internal teeth and a first and a second surface. The first and second surface having a friction material disposed thereon and at least one of the internal teeth has an aperture and the plurality of internal teeth intermesh with the plurality of external splines on the outer surface of the clutch hub, a plurality of reaction plates having a plurality of external teeth and a first and a second surface. The plurality of external teeth intermesh with the plurality of internal splines in the clutch housing, and a spacer member disposed in the aperture separates a first of the friction plates from a second of the friction plates.

17 Claims, 4 Drawing Sheets

(56) References Cited

U.S. PATENT DOCUMENTS

| | | | |
|---|---|---|---|
| 4,573,374 A | 3/1986 | Koshimo et al. | |
| 4,676,121 A | 6/1987 | Kouno | |
| 4,800,996 A | 1/1989 | Loizeau | |
| 5,551,928 A | 9/1996 | Sudau | |
| 5,634,866 A | 6/1997 | Sudau | |
| 5,713,813 A | 2/1998 | von Greyerz | |
| 5,716,300 A | 2/1998 | Sammataro et al. | |
| 5,733,218 A | 3/1998 | Sudau et al. | |
| 5,735,768 A | 4/1998 | Sudau | |
| 5,766,109 A | 6/1998 | Sudau | |
| 5,816,973 A | 10/1998 | Sudau et al. | |
| 5,836,217 A | 11/1998 | Sudau et al. | |
| 5,863,274 A | 1/1999 | Jackel | |
| 5,878,856 A | 3/1999 | Sudau et al. | |
| 5,967,939 A | 10/1999 | Reik et al. | |
| 5,976,048 A | 11/1999 | Sudau et al. | |
| 6,003,650 A | 12/1999 | Kleifges | |
| 6,019,663 A | 2/2000 | Sudau | |
| 6,026,944 A * | 2/2000 | Satou | F16D 13/52 192/70.2 |
| 6,058,801 A | 5/2000 | Schierling et al. | |
| 6,058,802 A | 5/2000 | Sudau et al. | |
| 6,099,434 A | 8/2000 | Sasse et al. | |
| 6,102,174 A | 8/2000 | Sasse | |
| 6,126,568 A | 10/2000 | Sudau | |
| 6,200,222 B1 | 3/2001 | Sudau | |
| 6,230,862 B1 | 5/2001 | Reik et al. | |
| 6,231,472 B1 | 5/2001 | Sudau et al. | |
| 6,354,974 B1 | 3/2002 | Kozarekar | |
| 6,398,655 B1 | 6/2002 | Orlamunder et al. | |
| 6,435,998 B1 | 8/2002 | Sudau et al. | |
| 6,439,362 B2 | 8/2002 | Reik et al. | |
| 6,543,596 B2 * | 4/2003 | Martin | F16D 25/0638 188/71.5 |
| 6,591,705 B1 | 7/2003 | Reik et al. | |
| 6,695,109 B2 | 2/2004 | Wack et al. | |
| 6,758,315 B2 | 7/2004 | Bauer et al. | |
| 6,799,665 B1 | 10/2004 | Sasse et al. | |
| 6,832,672 B2 | 12/2004 | Bauer et al. | |
| 6,887,180 B2 | 5/2005 | Pels et al. | |
| 6,962,533 B2 | 11/2005 | Zottmann et al. | |
| 7,073,646 B2 | 7/2006 | Sasse et al. | |
| 7,108,626 B2 | 9/2006 | Friedmann | |
| 7,114,565 B2 | 10/2006 | Man et al. | |
| 7,143,879 B2 | 12/2006 | Ackermann et al. | |
| 7,261,665 B2 | 8/2007 | Friedmann et al. | |
| 7,267,212 B2 | 9/2007 | Wack et al. | |
| 7,287,634 B2 | 10/2007 | Agner et al. | |
| 7,484,607 B2 | 2/2009 | Schneider et al. | |
| 7,523,817 B2 | 4/2009 | Forster | |
| 7,530,223 B2 | 5/2009 | Ender et al. | |
| 7,604,542 B2 | 10/2009 | Bach et al. | |
| 7,648,009 B2 | 1/2010 | Wack et al. | |
| 7,651,399 B2 | 1/2010 | Wack | |
| 7,662,043 B2 | 2/2010 | Schmid et al. | |
| 7,743,900 B2 | 6/2010 | Breier | |
| 7,993,204 B2 | 8/2011 | Dogel | |
| 8,075,410 B2 | 12/2011 | Carlson et al. | |
| 8,313,385 B2 | 11/2012 | Mundt et al. | |
| 8,919,518 B2 | 12/2014 | Diemer et al. | |
| 8,939,270 B2 | 1/2015 | Dziurda | |
| 2009/0314601 A1 * | 12/2009 | Copeland | F16D 13/52 192/102 |
| 2010/0216555 A1 | 8/2010 | Le Moal | |
| 2011/0143843 A1 | 6/2011 | Yamamoto et al. | |
| 2012/0228077 A1 * | 9/2012 | DeGowske | F16D 13/648 192/70.11 |
| 2013/0269475 A1 | 10/2013 | Le Moal | |
| 2014/0162834 A1 | 6/2014 | Dogel et al. | |
| 2015/0345569 A1 * | 12/2015 | Erhard | F16D 13/69 192/70.23 |
| 2018/0252273 A1 * | 9/2018 | Friess | F16D 13/52 |

FOREIGN PATENT DOCUMENTS

| | | |
|---|---|---|
| DE | 3630398 A1 | 5/1987 |
| DE | 3612583 A1 | 10/1987 |
| DE | 3624496 A1 | 1/1988 |
| DE | 3624498 A1 | 1/1988 |
| DE | 3834284 A1 | 4/1990 |
| DE | 3926384 A1 | 2/1991 |
| DE | 3934798 A1 | 4/1991 |
| DE | 4121586 A1 | 1/1993 |
| DE | 4128868 A1 | 3/1993 |
| DE | 4333562 A1 | 4/1994 |
| DE | 4444196 A1 | 6/1995 |
| DE | 19514411 A1 | 11/1995 |
| EP | 0041708 A2 | 12/1981 |
| EP | 0086044 A1 | 8/1983 |
| EP | 0533426 A2 | 3/1993 |
| FR | 2782766 A1 | 3/2000 |
| GB | 2220464 A | 10/1990 |
| GB | 2285109 A | 6/1995 |
| GB | 2292596 A | 2/1996 |
| GB | 2320534 A | 6/1998 |
| JP | S602249 A | 1/1985 |
| WO | WO2006082455 A1 | 8/2006 |

* cited by examiner

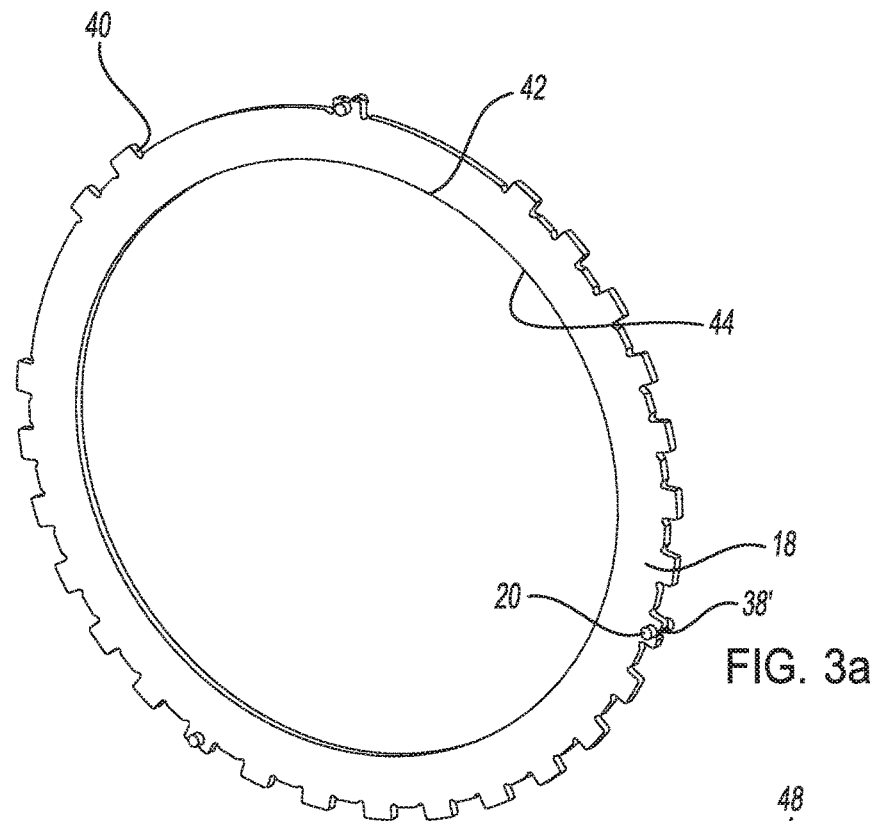
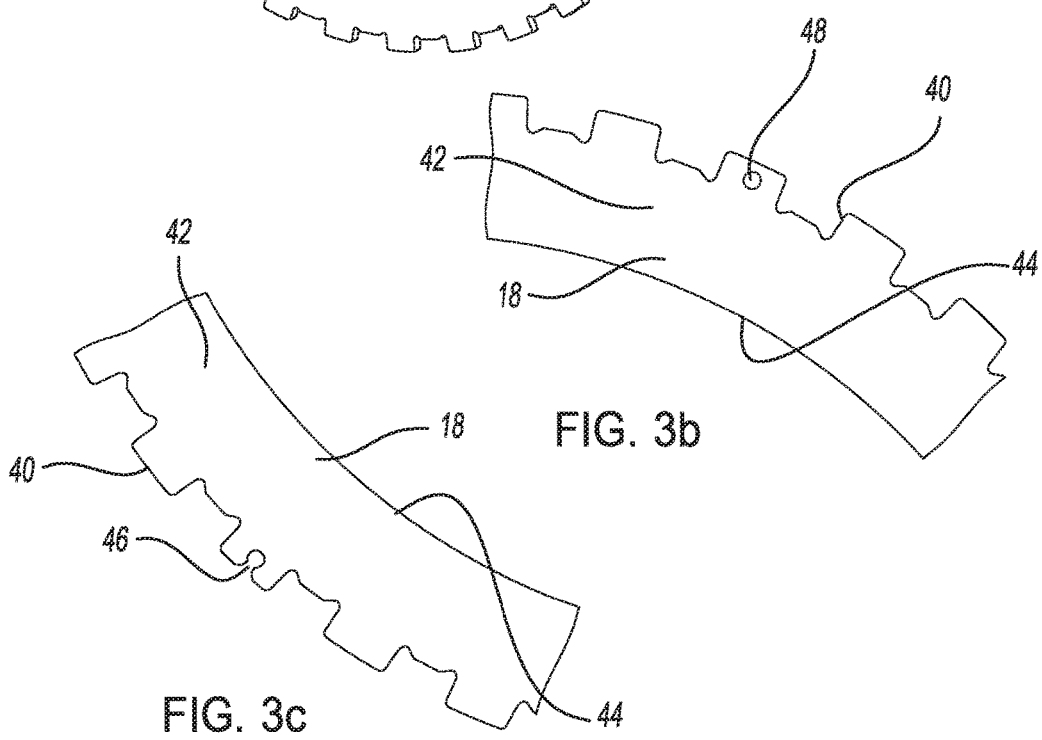
FIG. 3a
FIG. 3b
FIG. 3c

CLUTCH FOR A TRANSMISSION

FIELD

The present invention relates generally to automotive transmissions having multiple plate clutches, and more particularly, to systems and devices for separating, and thereby reducing drag between relatively rotating plates of an automotive clutch.

BACKGROUND

The statements in this section merely provide background information related to the present disclosure and may or may not constitute prior art.

Clutches are employed for interruptably coupling two rotating components to one another, such as for example, an engine to a transmission. In multiple plate clutches, friction plates on a drive member rotate relative to interposed friction plates on another member when the clutch is disengaged. When the clutch is engaged, the multiple plates of the clutch are brought into physical contact, and the multiple plates frictionally engage with one another. When the clutch is disengaged, to reduce frictional drag between relatively rotating plates clutch plate separation devices, such as annular wave springs, may be disposed between the friction plates to effect plate separation.

While traditional multi-plate clutch separation mechanisms are effective, there is room in the art for an improved multi-plate clutch separation mechanism that ensures rapid clutch plate separation without additional rotating mass or substantial cost. Especially desirable, would be a multi-plate clutch separation mechanism that can be fitted to currently-available transmissions as well as future transmissions.

SUMMARY

In one embodiment of the present invention, a torque transmitting device for an automotive transmission includes, a clutch housing having a plurality of internal splines extending radially inwardly from an interior surface of the clutch housing, a clutch hub having a plurality of external splines extending radially outwardly from an outer surface of the clutch hub, a plurality of friction plates having a plurality of internal teeth and a first and a second surface, wherein the first and second surface has a friction material disposed thereon and wherein at least one of the plurality of internal teeth has an aperture and wherein the plurality of internal teeth intermesh with the plurality of external splines on the outer surface of the clutch hub, a plurality of reaction plates having a plurality of external teeth and a first and a second surface, and wherein the plurality of external teeth intermesh with the plurality of internal splines on the inner surface of the clutch housing. The torque transmitting device for an automotive transmission also includes a spacer member disposed in the aperture for separating a first of the plurality of friction plates from a second of the plurality of friction plates.

In another embodiment of the present invention, the spacer member is a resilient member.

In yet another embodiment of the present invention, the resilient member is a rubber cylindrical member.

In yet another embodiment of the present invention, the resilient member is a helical spring.

In yet another embodiment of the present invention, at least one of the plurality of external teeth of the plurality of reaction plates has an aperture.

In yet another embodiment of the present invention, a spacer member is disposed in the aperture of the at least one of the plurality of external teeth of the plurality of reaction plates for separating a first of the plurality of reaction plates from a second of the plurality of reaction plates.

In yet another embodiment of the present invention, the aperture in at least one of the plurality of external teeth of the plurality of reaction plates is a slot.

In yet another embodiment of the present invention, the rubber cylindrical member has a reduced cross-section portion configure for engagement with the slot in at least one of the plurality of external teeth of the plurality of reaction plates.

In yet another embodiment of the present invention, the aperture in at least one of the plurality of external teeth of the plurality of reaction plates is circular in shape.

In yet another embodiment of the present invention, the helical spring is configured for engagement with the circular shape aperture in at least one of the plurality of external teeth of the plurality of reaction plates.

In still another embodiment of the present invention, a torque transmitting device for an automotive transmission includes, a clutch housing having a plurality of internal splines extending radially inwardly from an interior surface of the clutch housing, a clutch hub having a plurality of external splines extending radially outwardly from an outer surface of the clutch hub, a plurality of friction plates having a plurality of internal teeth and a first and a second surface, wherein the first and second surface has a friction material disposed thereon and wherein at least one of the plurality of internal teeth has an aperture and wherein the plurality of internal teeth intermesh with the plurality of external splines on the outer surface of the clutch hub, a plurality of reaction plates having a plurality of external teeth and a first and a second surface, and wherein at least one of the plurality of external teeth has an aperture wherein the plurality of external teeth intermesh with the plurality of internal splines on the inner surface of the clutch housing, a first spacer member disposed in the aperture of the at least one of the plurality of internal teeth for separating a first of the plurality of friction plates from a second of the plurality of friction plates. The torque transmitting device for an automotive transmission also includes a second spacer member disposed in the aperture of the at least one of the plurality of external teeth for separating a first of the plurality of reaction plates from a second of the plurality of friction plates.

In yet another embodiment of the present invention, the first and second spacer members are a first and a second resilient member.

In yet another embodiment of the present invention, the first and the second resilient member are rubber cylindrical members.

In yet another embodiment of the present invention, the first and the second resilient member is a first and a second helical spring.

In yet another embodiment of the present invention, the aperture in at least one of the plurality of internal teeth of the plurality of friction plates is a slot.

In yet another embodiment of the present invention, the aperture in at least one of the plurality of external teeth of the plurality of reaction plates is a slot.

In yet another embodiment of the present invention, the aperture in at least one of the plurality of internal teeth of the plurality of friction plates is a circular shaped aperture.

In yet another embodiment of the present invention, the aperture in at least one of the plurality of external teeth of the plurality of reaction plates is a circular shaped aperture.

In yet another embodiment of the present invention, the rubber cylindrical member has a reduced cross-section portion configured for engagement with the slot in at least one of the plurality of external teeth of the plurality of reaction plates and the slot in at least one of the plurality of internal teeth of the plurality of friction plates.

In yet another embodiment of the present invention, the first and second helical springs are configured for engagement with the circular shaped aperture in at least one of the plurality of external teeth of the plurality of reaction plates and the circular shaped aperture in at least one of the plurality of internal teeth of the plurality of friction plates.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 3a is a perspective view of a reaction plate of a torque transmitting device for an automotive transmission, according to the principles of the present invention;

FIG. 3b is a perspective view of a portion of a reaction plate of a torque transmitting device for an automotive transmission, according to the principles of the present invention;

FIG. 3c is a plan view of a portion of a reaction plate of a torque transmitting device for an automotive transmission, according to the principles of the present invention;

DETAILED DESCRIPTION

Figure 1:
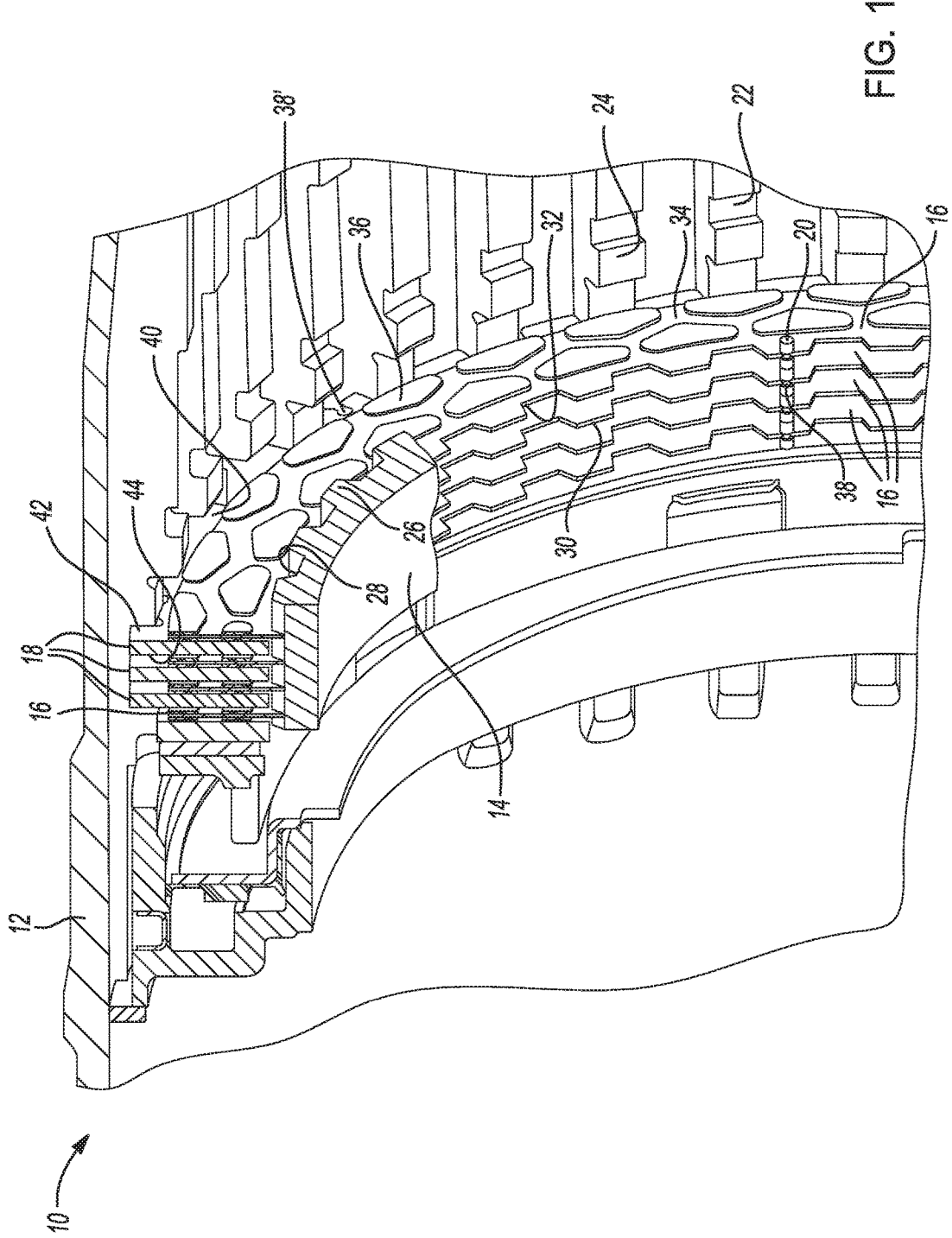
FIG. 1 is a perspective cross-sectional view of a torque transmitting device for an automotive transmission, according to the principles of the present invention.
Figure 2A:
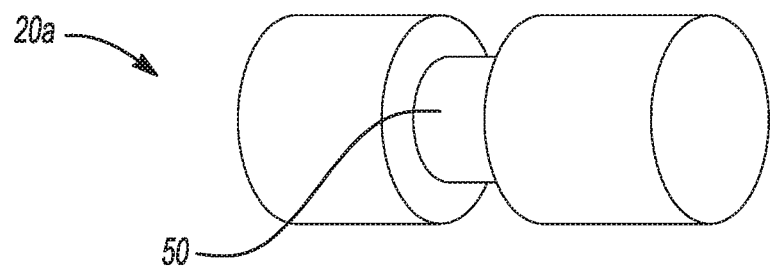
FIG. 2a is a perspective view of a spacer member of a torque transmitting device for an automotive transmission, according to the principles of the present invention.
Figure 2B:
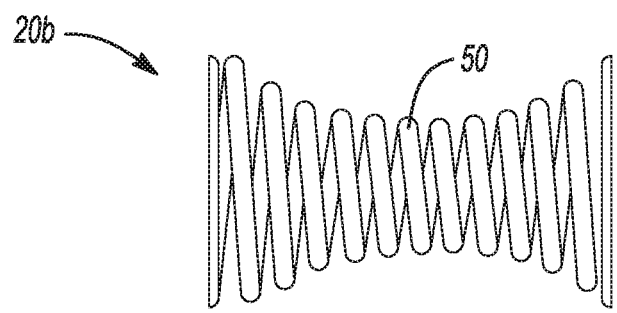
FIG. 2b is a plan view of a helical spring spacer member with a reduced cross sectional portion for a torque transmitting device for an automotive transmission, according to the principles of the present invention.
Figure 2C:
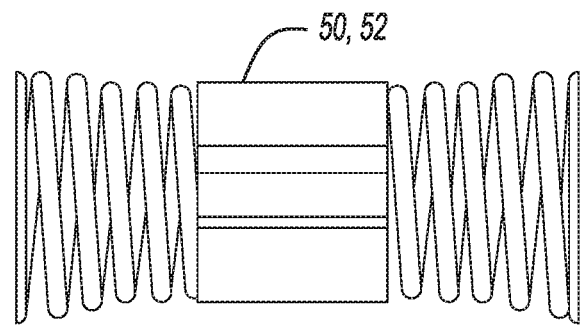
FIG. 2c is a plan view of a helical spring spacer member having a base component for a torque transmitting device for an automotive transmission, according to the principles of the present invention.
Figure 2D:
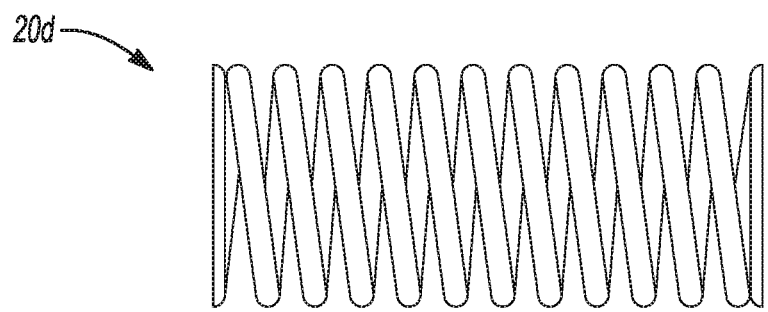
FIG. 2d is a plan view of a helical spring spacer member of a torque transmitting device for an automotive transmission, according to the principles of the present invention.

The following description is merely exemplary in nature and is not intended to limit the present disclosure, application, or uses.

Referring now to FIGS. 1 and 2a-d a torque transmitting device 10 for an automotive transmission is shown. The torque transmitting device 10 includes a clutch housing 12, a clutch hub 14, a plurality of friction plates 16, a plurality of reaction plates 18, and spacer members 20.

The clutch housing 12 has a plurality of internal splines 22 which extend radially inwardly from an interior surface 24 of the clutch housing 12. The clutch hub 14 has a plurality of external splines 26 extending radially outwardly from an outer surface 28 of the clutch hub. Each of the plurality of friction plates 16 is disposed within the clutch housing 12 and has a plurality of internal teeth 30 and a first 32 and a second surface 34. A friction material 36 is disposed on the first surface 32 and the second surface 34 of the plurality of friction plates 16. The plurality of internal teeth 30 also intermesh with the plurality of external splines 26 on the outer surface 28 of the clutch hub 14. Additionally, at least one of the plurality of internal teeth 30 of the plurality of friction plates 16 has an aperture 38. The aperture 38 is formed through at least one of the internal teeth 30 of the plurality of friction plates 16.

Each of the plurality of reaction plates 18 has a plurality of external teeth 40 and a first 42 and a second surface 44. The plurality of external teeth 40 of the reaction plates 18 intermesh with the plurality of internal splines 22 on the inner surface 24 of the clutch housing 12. At least one of the plurality of external teeth 40 of the plurality of reaction plates 18 has an aperture 38'. The aperture 38' is formed through at least one of the external teeth 40 of the plurality of reaction plates 18.

In an example, the plurality of friction plates 16 is alternatingly disposed with the plurality of reaction plates 18. That is, the plurality of friction plates 16 are generally disposed adjacent to at least one of the plurality of reaction plates 18 such that the first surface 32 of a friction plate 16 is adjacent to the first surface 42 of a reaction plate and the second surface 34 of a friction plate 16 is adjacent to the second surface 44 of a reaction plate. With further reference to the example above, in the configuration described, the friction material 36 on the first and second surfaces 32, 34 of the plurality of friction plates 16 is placed in contact with the first and second surfaces 42, 44 of the plurality of reaction plates when the clutch is engaged.

In one aspect of the present invention, the spacer members 20 are disposed in the aperture 38 of the internal teeth 30 of at least one of the plurality of friction plates 16, and separate a first of the plurality of friction plates 16 from a second of the plurality of friction plates 16. In another aspect, the spacer members 20 are disposed in the aperture 38' of at least one of the plurality of external teeth 40 of the plurality of reaction plates 18. The spacer members 20 separate a first of the plurality of reaction plates 18 from a second of the plurality of reaction plates 18. Moreover, in one aspect of the present invention, the spacer members 20 are disposed in the apertures 38, 38' of at least one of the plurality of friction plates 16 and at least one of the plurality of reaction plates 18, and the spacer members 20 axially separate the plurality of friction plates 16 from the plurality of reaction plates 18.

Referring now to FIGS. 2a-d, and 3a-c, the apertures 38, 38' are configured to receive the spacer members 20, and may take a variety of forms including but not limited to slots 46 and circular openings 48. The spacer members 20 are disposed in the aperture 38, 38' of at least one of the plurality of friction plates 16 and/or at least one of the plurality of reaction plates 18. The spacer members 20 may be any resilient members, such as a rubber cylindrical members 20a, or a helical springs 20b-d. In one aspect, the spacer members 20 may be rubber cylindrical members 20a having a reduced cross-sectional portion 50 configured to engage with the slot 46 or circular aperture 48 in at least one of the plurality of external teeth 40 of the plurality of reaction plates 18, or in at least one of the plurality of internal teeth 30 of the plurality of friction plates 16. In an aspect, the spacer members 20 may be helical springs 20b-d having a base component 52, such as the base component 52 of helical spring 20c, configured for engagement with the slot 46 or circular aperture 48 in at least one of the plurality of external teeth 40 of the plurality of reaction plates 18, or in at least one of the plurality of internal teeth 30 of the plurality of friction plates 16.

Turning again to FIGS. 1 and 2a-d, and with additional reference to FIGS. 3a-c, 4a, and 4b, the spacer members 20 are disposed in the apertures 38 of at least one of the plurality of internal teeth 30 of the plurality of friction plates 16 or in the aperture 38' of at least one of the plurality of external teeth 40 of the plurality of reaction plates 18. With the spacer members 20 disposed in at least one of the plurality of internal teeth 30, a first of the plurality of friction plates 16 may be separated from a second of the plurality of friction plates 16. With the spacer members 20 disposed in at least one of the plurality of external teeth 40, a first of the plurality of reaction plates 18 may be separated from a second of the plurality of reaction plates 18. Furthermore, with the spacer members 20 disposed in at least one of the plurality of internal teeth 30 of a first of the plurality of friction plates 16, or within at least one of the plurality of external teeth 40 of a first of the plurality of reaction plates 18, the first of the friction plates 16 may be separated from the first of the reaction plates 18.

With particular reference to FIG. 3a, an exemplary reaction plate 18 having a plurality of spacer members 20 is shown. The spacer members 20 are disposed within exemplary apertures 38' of the plurality of external teeth 40 of the reaction plates 18. In the portions of the exemplary reaction plates of FIGS. 3b and 3c, exemplary apertures 38' are shown. In FIG. 3b, a circular aperture 48 is displayed, and in FIG. 3c, a slot 46 aperture 38' is shown.

Figure 4A:
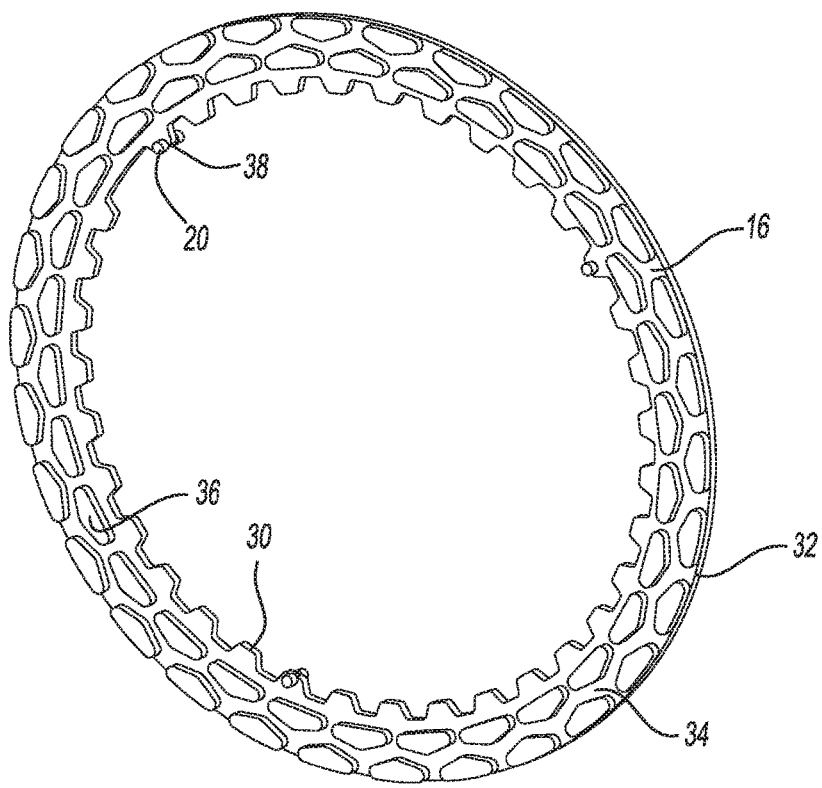
FIG. 4a is a perspective view of a friction plate of a torque transmitting device for an automotive transmission, according to the principles of the present invention.
Figure 4B:
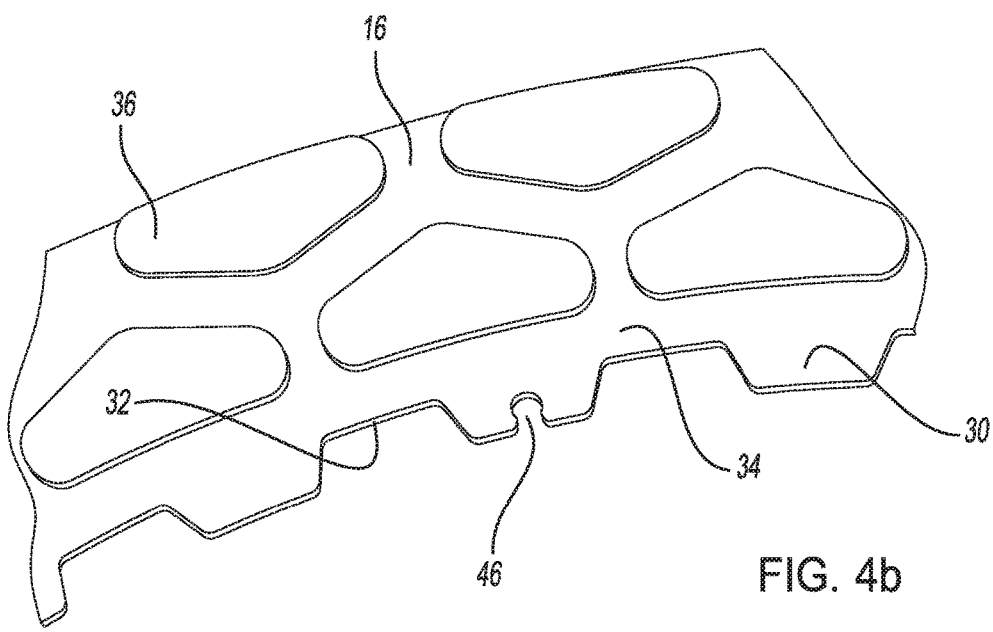
FIG. 4b is a perspective view of a portion of a friction plate of a torque transmitting device for an automotive transmission, according to the principles of the present invention.

Similarly, in the views of FIGS. 4a and 4b, an exemplary friction plate 16 has a plurality of spacer members 20 disposed within a plurality of internal teeth 30 of the friction plate 16. Moreover, in an aspect, the exemplary apertures 38 are slots 46 configured to receive the spacer members 20.

Because the apertures 38, 38' of the friction plates 16 and the reaction plates 18 are voids, the relative masses of the friction plates 16 and reaction plates 18 are reduced. However, the mass reduction of the apertures 38, 38' is negated by the addition of the spacer members 20. Thus, in an aspect, the addition of spacer members 20 is mass-neutral. Additionally, the spacer members 20 perform a mechanical function, rapidly separating the friction plates 16 and the reaction plates 18 from each other when the torque transmitting device 10 is disengaged. The rapid separation of the friction plates 16 and reaction plates 18 reduces frictional wear to the friction plates 16 and reaction plates 18, thereby prolonging the lifespan of the torque transmitting device 10.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A torque transmitting device for an automotive transmission, the torque transmitting device comprising:
a clutch housing having a plurality of internal splines extending radially inwardly from an interior surface of the clutch housing;
a clutch hub having a plurality of external splines extending radially outwardly from an outer surface of the clutch hub;
a plurality of friction plates having a plurality of internal teeth and a first and a second surface, wherein the first and the second surface has a friction material disposed thereon and wherein at least one of the plurality of internal teeth has an aperture and wherein the plurality of internal teeth intermesh with the plurality of external splines on the outer surface of the clutch hub;
a plurality of reaction plates having a plurality of external teeth and a first and a second surface, and wherein the plurality of external teeth intermesh with the plurality of internal splines on the inner surface of the clutch housing; and
a first spacer member disposed in and extending through the aperture of a first of the plurality of friction plates, the first spacer member contacting a second spacer member disposed in and extending through an aperture of a second of the plurality of friction plates, the first and the second spacer members separating the first of the plurality of friction plates from the second of the plurality of friction plates,
wherein at least one of the plurality of external teeth of the plurality of reaction plates has an aperture, wherein the first spacer member and the second spacer member are resilient and each have a reduced cross-section portion configured to engage with the aperture, wherein the reduced cross-section portion is disposed between a first portion and a second portion, both the first and the second portions having a cross-section larger than the reduced cross-section portion.

2. The torque transmitting device of claim 1 wherein one or more of the first spacer member and the second spacer member is a rubber cylindrical member.

3. The torque transmitting device of claim 2 wherein the first spacer member and the second spacer member each further comprises a first helical spring portion connected to a rubber cylindrical portion and a second helical spring portion connected to the rubber cylindrical portion, the first helical spring portion disposed opposite the second helical spring portion.

4. The torque transmitting device of claim 1 wherein the first portion and the second portion are helical springs.

5. The torque transmitting device of claim 1 wherein a third spacer member is disposed in the aperture of the at least one of the plurality of external teeth of a first of the plurality of reaction plates, the third spacer member contacting a fourth spacer member disposed in an aperture of a second of the plurality of reaction plates, the third and fourth spacer members separating the first of the plurality of reaction plates from the second of the plurality of reaction plates.

6. The torque transmitting device of claim 1 wherein the aperture in at least one of the plurality of external teeth of the plurality of reaction plates is circular in shape.

7. The torque transmitting device of claim 6 wherein the first spacer member comprises one or more helical springs configured for engagement with the circular shape aperture in at least one of the plurality of external teeth of the plurality of reaction plates.

8. A torque transmitting device for an automotive transmission, the torque transmitting device comprising:
a clutch housing having a plurality of internal splines extending radially inwardly from an interior surface of the clutch housing;

a clutch hub having a plurality of external splines extending radially outwardly from an outer surface of the clutch hub;

a plurality of friction plates having a plurality of internal teeth and a first and a second surface, wherein the first and second surface has a friction material disposed thereon and wherein at least one of the plurality of internal teeth has an aperture and wherein the plurality of internal teeth intermesh with the plurality of external splines on the outer surface of the clutch hub;

a plurality of reaction plates having a plurality of external teeth and a first and a second surface, and wherein at least one of the plurality of external teeth has an aperture wherein the plurality of external teeth intermesh with the plurality of internal splines on the inner surface of the clutch housing;

a first spacer member disposed in and extending through the aperture of a first of the plurality of internal teeth, the first spacer member contacting a second spacer member disposed in and extending through an aperture of a second of the plurality of internal teeth and separating a first of the plurality of friction plates from a second of the plurality of friction plates; and a third spacer member disposed in and extending through the aperture of a first of the plurality of external teeth, the third spacer member contacting a fourth spacer member disposed in and extending through an aperture of a second of the plurality of external teeth and separating a first of the plurality of reaction plates from a second of the plurality of reaction plates, wherein each of the third and fourth spacer members has a reduced cross-section portion configured for engagement with the aperture in at least one of the plurality of external teeth of the plurality of reaction plates and each of the first and second spacer members has a reduced cross-section portion configured for engagement with the aperture in at least one of the plurality of internal teeth of the plurality of friction plates, wherein the reduced cross-section portion of each of the first, second, third, and fourth spacer members is disposed between a first portion and a second portion, both the first and the second portions having a cross-section larger than the reduced cross-section portion.

9. The torque transmitting device of claim 8 wherein the first spacer member and the second spacer member further comprises a first helical spring portion connected to a rubber cylindrical portion and a second helical spring portion connected to the rubber cylindrical portion, the first helical spring portion disposed opposite the second helical spring portion.

10. The torque transmitting device of claim 8 wherein the first, second, third, and fourth spacer members are a first, a second, a third, and a fourth resilient member.

11. The torque transmitting device of claim 10 wherein the first, second, third, and fourth resilient members are rubber cylindrical members.

12. The torque transmitting device of claim 10 wherein the first, second, third, and fourth resilient members are a first, a second, a third, and a fourth helical spring.

13. The torque transmitting device of claim 12 wherein the third and the fourth helical springs are configured for engagement with a circular shaped aperture in at least one of the plurality of external teeth of the plurality of reaction plates and wherein the first and second helical springs are configured for engagement with a circular shaped aperture in at least one of the plurality of internal teeth of the plurality of friction plates.

14. The torque transmitting device of claim 8 wherein the aperture in at least one of the plurality of internal teeth of the plurality of friction plates is a slot.

15. The torque transmitting device of claim 8 wherein the aperture in at least one of the plurality of external teeth of the plurality of reaction plates is a slot.

16. The torque transmitting device of claim 8 wherein the aperture in at least one of the plurality of internal teeth of the plurality of friction plates is a circular shaped aperture.

17. The torque transmitting device of claim 8 wherein the aperture in at least one of the plurality of external teeth of the plurality of reaction plates is a circular shaped aperture.

* * * * *